(12) United States Patent
Gao

(10) Patent No.: US 11,187,960 B2
(45) Date of Patent: Nov. 30, 2021

(54) LIQUID CRYSTAL LENS WITH TWO LIQUID CRYSTAL CELLS, CONTROL METHOD THEREOF, LIQUID CRYSTAL LENS MODULE AND DISPLAY DEVICE

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/399,183

(22) Filed: Apr. 30, 2019

(65) Prior Publication Data
US 2020/0033694 A1 Jan. 30, 2020

(30) Foreign Application Priority Data
Jul. 27, 2018 (CN) .......................... 201810845109.3

(51) Int. Cl.
G02F 1/29 (2006.01)
F21V 8/00 (2006.01)
G02B 27/01 (2006.01)

(52) U.S. Cl.
CPC ............... *G02F 1/29* (2013.01); *G02B 6/005* (2013.01); *G02B 6/0026* (2013.01);
(Continued)

(58) Field of Classification Search
CPC combination set(s) only.
See application file for complete search history.

(56) References Cited

U.S. PATENT DOCUMENTS

2002/0085287 A1* 7/2002 Egawa .................. G02B 30/27
359/619
2004/0108984 A1 6/2004 Ogasawara
(Continued)

FOREIGN PATENT DOCUMENTS

CN 1890988 A 1/2007
CN 102193202 A 9/2011
(Continued)

OTHER PUBLICATIONS

First Office Action for Chinese Application No. 201810845109.3, dated Dec. 3, 2020, 12 Pages.
(Continued)

*Primary Examiner* — Lauren Nguyen
(74) *Attorney, Agent, or Firm* — Brooks Kushman P.C.

(57) ABSTRACT

A liquid crystal lens, a control method thereof, a liquid crystal lens module and a display device are provided. The liquid crystal lens includes a first transparent substrate and two liquid crystal cells arranged at two opposite sides of the first transparent substrate. Each liquid crystal cell includes a first transparent electrode layer and a second transparent electrode layer; and a liquid crystal layer therebetween. The second transparent electrode layer includes a first electrode sub-layer and a second electrode sub-layer. The first electrode sub-layer includes N concentric first annular electrodes, and the second electrode sub-layer includes N concentric second annular electrodes. The first annular electrodes and the second annular electrodes are alternately arranged in a direction parallel with the first transparent electrode layer. Initial alignment orientations of liquid crystal molecules in liquid crystal layers in the two liquid crystal cells are perpendicular to each other.

16 Claims, 8 Drawing Sheets

(52) U.S. Cl.
CPC .......... *G02B 27/0172* (2013.01); *G02F 1/294* (2021.01); *G02F 2201/122* (2013.01)

(56) References Cited

U.S. PATENT DOCUMENTS

| | | | |
|---|---|---|---|
| 2008/0278640 A1* | 11/2008 | Ijzerman | G02B 5/0242 349/15 |
| 2011/0228181 A1* | 9/2011 | Jeong | G02B 5/1876 349/15 |
| 2011/0234934 A1 | 9/2011 | Chang | |
| 2014/0139768 A1* | 5/2014 | Galstian | G02F 1/29 349/33 |
| 2016/0018657 A1 | 1/2016 | Hong et al. | |
| 2019/0094650 A1 | 3/2019 | Gao et al. | |
| 2020/0355942 A1 | 11/2020 | Wang et al. | |

FOREIGN PATENT DOCUMENTS

| | | | | |
|---|---|---|---|---|
| CN | 104020624 A | 9/2014 | | |
| CN | 104981717 A | 10/2015 | | |
| CN | 105911747 A | 8/2016 | | |
| CN | 107085316 A | 8/2017 | | |
| CN | 107329309 A | 11/2017 | | |
| CN | 107367845 A | 11/2017 | | |
| CN | 107479248 A | 12/2017 | | |
| CN | 10-8254925 | * | 7/2018 | ............. G02B 27/01 |
| CN | 108254925 A | 7/2018 | | |
| CN | 108287409 A | 7/2018 | | |
| EP | 2682812 A1 | 1/2014 | | |

OTHER PUBLICATIONS

Second Office Action for Chinese Application No. 201810845109.3, dated Jul. 8, 2021, 12 Pages.

* cited by examiner

LIQUID CRYSTAL LENS WITH TWO LIQUID CRYSTAL CELLS, CONTROL METHOD THEREOF, LIQUID CRYSTAL LENS MODULE AND DISPLAY DEVICE

CROSS-REFERENCE TO RELATED APPLICATION

This application claims priority to Chinese Patent Application No. 201810845109.3 filed on Jul. 27, 2018, which is incorporated herein by reference in its entirety.

TECHNICAL FIELD

The present disclosure relates to the field of display technology, and in particular to a liquid crystal lens, a control method thereof, a liquid crystal lens module and a display device.

BACKGROUND

Currently, virtual reality (VR) devices and augmented reality (AR) devices are more and more widely used. In VR or AR display technology, a display module functioning as an image source and a lens cooperate with each other, where a magnified virtual image of an image displayed by the display module is formed by the lens for a user to view. In general, a virtual reality device further includes a light guide module configured to deflect an optical path of light of the displayed image after passing through the lens, so that imaging light can enter a human eye, thereby forming AR display. AR devices and VR devices are similar in that a virtual image of a displayed image is formed by arranging a display panel within a focal length of an imaging lens in both kinds of devices, and the difference therebetween lies in that the AR devices guide both imaging light and ambient light into a human eye, thereby achieving augmented reality display.

SUMMARY

In a first aspect, a liquid crystal lens is provided according to an embodiment of the present disclosure, which includes:

a first transparent substrate, and two liquid crystal cells arranged at two opposite sides of the first transparent substrate, where each liquid crystal cell includes:

a first transparent electrode layer and a second transparent electrode layer that are stacked; and a liquid crystal layer between the first transparent electrode layer and the second transparent electrode layer;

where the second transparent electrode layer includes a first electrode sub-layer and a second electrode sub-layer that are stacked in sequence; and the first transparent electrode layer is of a plate-like structure, the first electrode sub-layer includes N concentric first annular electrodes, and the second electrode sub-layer includes N concentric second annular electrodes, where N is a positive integer and the first annular electrodes and the second annular electrodes are alternately arranged in a direction parallel with the first transparent electrode layer;

where initial alignment orientations of liquid crystal molecules in liquid crystal layers in the two liquid crystal cells are perpendicular to each other.

In some optional embodiments, a first non-electrode region is formed between each two adjacent first annular electrodes, a second non-electrode region is formed between each two adjacent second annular electrodes, and orthographic projections of the first annular electrodes onto the first transparent substrate coincide with orthographic projections of second non-electrode regions onto the first transparent substrate.

In some optional embodiments, a thickness of the liquid crystal layer is:

$$d = \frac{\lambda/2}{n_e - n_o},$$

where $n_e$ is a liquid crystal refractive index for incident light with a polarization direction parallel with a long axis of a liquid crystal molecule in the liquid crystal layer, and $n_o$ is a liquid crystal refractive index for incident light with a polarization direction perpendicular to the long axis of the liquid crystal molecule in the liquid crystal layer.

In some optional embodiments, the N concentric first annular electrodes, the N concentric second annular electrodes and the liquid crystal layer form N equivalent phase grating units, and each equivalent phase grating unit includes two steps, where a first step of the two steps corresponds to the first annular electrode and a second step of the two steps corresponds to the second annular electrode;

an outer diameter of a first step of a $j^{th}$ equivalent phase grating unit is:

$$r_{j,1} = \sqrt{\frac{(2j-1)f_1'\lambda}{n_2}\left(1 - \frac{(2j-1)\lambda}{4n_2 f_1'}\right)^{1/2}};$$

an outer diameter of a second step of the $j^{th}$ equivalent phase grating unit is:

$$r_{j,2} = \sqrt{\frac{2jf_1'\lambda}{n_2}\left(1 - \frac{j\lambda}{2n_2 f_1'}\right)^{1/2}};$$

where $f_1'$ is a focal length of the liquid crystal lens, $\lambda$ is a wavelength of incident light, $n_2$ is a refractive index of an external medium in contact with a surface of the liquid crystal lens, j is a serial number of an equivalent phase grating unit numbered in such a manner as to increase in a radial direction starting from a center of the equivalent phase grating units and is smaller than N;

a width of a $j^{th}$ first annular electrode is:

$$d_{j,1} = r_{j,1} - r_{j-1,2}; \text{ and}$$

a width of a $j^{th}$ second annular electrode is:

$$d_{j,2} = r_{j,2} - r_{j,1}.$$

In some optional embodiments, the liquid crystal lens further includes a power supply module, where each first annular electrode and each second annular electrode are respectively provided with power supply wires, and the power module is configured to control power supply states of each first annular electrode and each second annular electrode independently through respective power supply wires to achieve multiple adjustable focal lengths of the liquid crystal lens.

In some optional embodiments, the power supply module is configured to:

power on the first transparent electrode layer; and divide the 2N annular electrodes in the second transparent electrode layer into x electrode groups, where each electrode group includes m adjacent annular electrodes and x=int (2N/m), number the x electrode groups in sequence in a radial direction starting from the center of the annular electrodes, and power off the odd-numbered electrode groups and power on the even-numbered electrodes groups, whereby an equivalent focal length of the liquid crystal lens is:

$$f_m = m^* f_1,$$

where $f_1$ is a minimum focal length of the liquid crystal lens and m is a positive integer smaller than N.

In some optional embodiments, the liquid crystal lens further includes a second transparent substrate and a third transparent substrate. The second transparent substrate is arranged at a side of a liquid crystal layer in a first liquid crystal cell of the two liquid crystal cells far away from the first transparent substrate, and the third transparent substrate is arranged at a side of a liquid crystal layer in a second liquid crystal cell of the two liquid crystal cells far away from the first transparent substrate.

In some optional embodiments, an orthographic projection of the first electrode sub-layer in a first liquid crystal cell of the two liquid crystal cells onto the first transparent substrate coincide with an orthographic projection of the first electrode sub-layer in a second liquid crystal cell of the two liquid crystal cells onto the first transparent substrate, and orthographic projections of the second electrode sub-layer in the first liquid crystal cell onto the first transparent substrate coincide with an orthographic projection of the second electrode sub-layer in the second liquid crystal cell onto the first transparent substrate.

In some optional embodiments, the second transparent electrode layer in the first liquid crystal cell is arranged between the first transparent substrate and a liquid crystal layer in the first liquid crystal cell, and the second transparent electrode layer in the second liquid crystal cell is arranged between the first transparent substrate and a liquid crystal layer in the second liquid crystal cell; or the second transparent electrode layer in the first liquid crystal cell is arranged between the second transparent substrate and the liquid crystal layer in the first liquid crystal cell, and the second transparent electrode layer in the second liquid crystal layer is arranged between the third transparent substrate and the liquid crystal layer in the second liquid crystal cell; or the second transparent electrode layer in the first liquid crystal cell is arranged between the first transparent substrate and the liquid crystal layer in the first liquid crystal cell, and the second transparent electrode layer in the second liquid crystal cell is arranged between the third transparent substrate and the liquid crystal layer in the second liquid crystal cell; or the second transparent electrode layer in the first liquid crystal cell is arranged between the second transparent substrate and the liquid crystal layer in the first liquid crystal cell, and the second transparent electrode layer in the second liquid crystal is arranged between the first transparent substrate and the liquid crystal layer in the second liquid crystal cell.

In a second aspect, a liquid crystal lens module is further provided according to an embodiment of the present disclosure, which includes a light guide module and the liquid crystal lens according to the first aspect.

In some optional embodiments, the light guide module includes:

a light guide plate; and a light guide-in grating and a light guide-out grating, arranged at two ends of the light guide plate;

where the light guide-in grating and the liquid crystal lens are arranged at two opposite sides of the light guide plate, the light guide-in grating is configured to guide light from the liquid crystal lens into the light guide plate, and the light guide-out grating is arranged at a same side with the light guide-in grating and is configured to guide the light in the light guide plate to an eye of a user.

In a third aspect, a display device is further provided according to an embodiment of the present disclosure, which includes:

a light guide module, including a light incident region and a light emergent region;

a display module, arranged corresponding to the light incident region of the light guide module and configured to display images; and the liquid crystal lens according to the first aspect, arranged between the display module and the light guide module and corresponding to the light incident region of the light guide module and configured to form virtual images for the images displayed on the display module, where the light guide module is configured to guide light emergent from the liquid crystal lens to propagate in a direction from the light incident region to the light emergent region within the light guide module.

In some optional embodiments, the light guide module includes:

a light guide plate;

a light guide-in grating, arranged corresponding to the light incident region and at a side of the light guide plate facing away from the liquid crystal lens, and configured to guide light from the liquid crystal lens with multiple adjustable focal lengths into the light guide plate; and a light guide-out grating, arranged corresponding to the light emergent region and at a same side with the light guide-in grating, and configured to guide the light in the light guide plate to an eye of a user.

In some optional embodiments, a distance between the display module and the liquid crystal lens is smaller than or equal to the minimum focal length adjustable of the liquid crystal lens.

In some optional embodiments, ambient light is incident on a side of the light guide-out grating away from the eye of the user, and the light guide-out grating is configured to guide zero-order diffraction light of the ambient light into the eye of the user, where a maximum half angle of view of the display device is:

$$\omega(d)_{max} = \arcsin\left(\frac{n-1}{2}\right)$$

where $\omega(d)_{max}$ is the maximum half angle of view, n is a refractive index of the light guide plate and a grating constant corresponding to the maximum half angle of view is $$d = \frac{2\lambda}{n+1}.$$

In a fourth aspect, a method for controlling the liquid crystal lens as described above is further provided according to an embodiment of the present disclosure, which includes powering on the two liquid crystal cells simultaneously in the following manner:

dividing the 2N annular electrodes into x electrode groups, where each electrode group includes m adjacent annular electrodes and x=int (2N/m), numbering the x electrode groups in sequence in a radial direction starting from a center of the annular electrode, powering off the odd-numbered electrode groups, and powering on the even-numbered electrodes groups and the first transparent electrode layer, whereby an equivalent focal length of the liquid crystal cells is:

$f_m = m*f_1$, where $f_1$ is the minimum focal length of the liquid crystal lens and m is a positive integer smaller than N.

BRIEF DESCRIPTION OF THE DRAWINGS

In order to clarify the technical solutions according to the embodiments of the present disclosure or conventional art, the appended drawings involved in the description of the following embodiments are briefly introduced hereinafter. Apparently, the drawings only illustrate some embodiments of the present disclosure, and other drawings may be obtained based on these drawings by those skilled in the art without any inventive efforts.

DETAILED DESCRIPTION

Figure 1A:
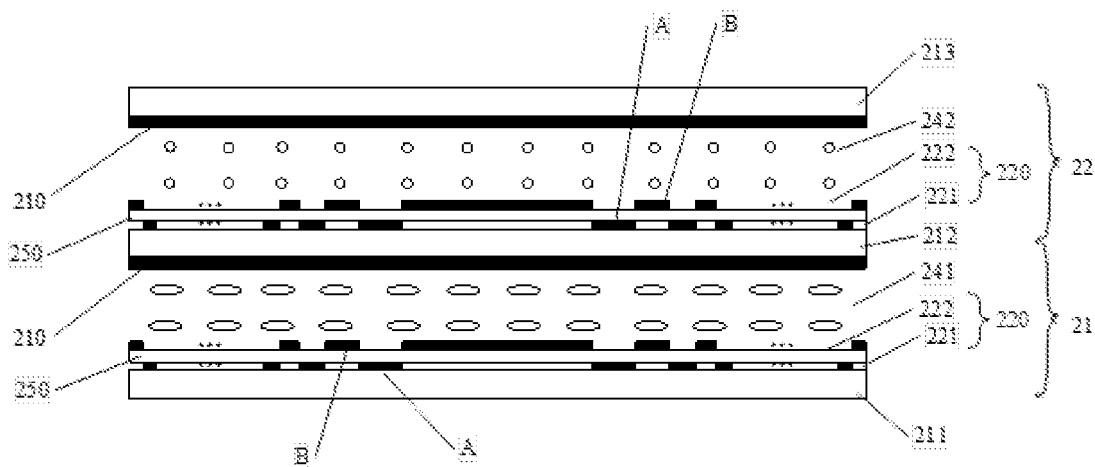
FIG. 1a is a schematic structural diagram of a liquid crystal lens according to an embodiment of the present disclosure.

In order to clearly clarify the present disclosure, descriptions are made in conjunction with some optional embodiments and the drawings. Similar parts in different drawings are denoted by same legends. It should be well appreciated by those skilled in the art that the following descriptions are intended for purpose of illustration rather than limitation, and the scope of the present disclosure is not limited by the descriptions.

Various cross-sectional views in the embodiments of the present disclosure are shown in the drawings. The figures are not drawn to scale, and some details are magnified for clarity of illustration and some details may be omitted. The various regions, the shapes of the layers, and the relative size and positional relationship between them are merely exemplary, and may actually be deviated due to manufacturing tolerances or technical limitations, and those skilled in the art may design regions/layers having different shapes, sizes, and relative positions on practical demands.

The imaging lens in related art has a fixed focal length, which only allows imaging in one spatial depth and thus cannot realize imaging in multiple spatial depths, and has a large spatial volume, with which it is difficult to flatten the whole device, thereby increasing the difficulty of mechanical structure design. In addition, the imaging lens in related art is generally applicable to linear polarized light with a polarization direction coinciding with an initial liquid crystal alignment orientation, or the imaging lens operates in cooperation with a polarizer, which limits application scenarios of the imaging lens or lowers optical efficiency of emitted light.

In view of the above, a liquid crystal lens is provided according to an embodiment of the present disclosure, as shown in FIG. 1a. the liquid crystal lens includes: a first transparent substrate 211, a second transparent substrate 212 and a third transparent substrate 213 which are stacked in sequence; and a first liquid crystal layer 241 between the first transparent substrate 211 and the second transparent substrate 212, and a second liquid crystal layer 242 between the second transparent substrate 212 and the third transparent substrate 213. The first transparent substrate 211 and the second transparent substrate 212 are aligned to each other, the second transparent substrate 212 and the third transparent substrate 213 are aligned to each other. Initial alignment orientations of liquid crystal molecules in the first liquid crystal layer 241 and the second liquid crystal layer 242 are perpendicular to each other. The first transparent substrate 211, the second transparent substrate 212, and the first liquid crystal layer 241 and electrode layers between the first and the second transparent liquid substrates form a first liquid crystal cell 21; and the second transparent substrate 212, the third transparent substrate 213, and the second liquid crystal layer 242 and electrode layers between the second and the third transparent substrates form a second liquid crystal cell 22.

Each liquid crystal cell includes a first transparent electrode layer 210 and a second transparent electrode layer 220 which are arranged at two opposite sides of the liquid crystal layer, where the second transparent electrode layer 220 includes a first electrode sub-layer 221 and a second electrode sub-layer 222. The first electrode sub-layer 121 includes N concentric first annular electrodes A, and a first non-electrode region is formed between each two adjacent first annular electrodes A, where N is a positive integer. The second electrode sub-layer 122 includes second annular electrodes B, each of which is arranged corresponding to a first non-electrode region, and a second non-electrode region is formed between each two adjacent second annular electrodes. The first annular electrodes A and the second annular electrodes B are alternately arranged in a direction parallel with the first transparent electrode layer. The initial alignment orientations of molecules in the first liquid crystal layer 241 and the second liquid crystal layer 242 in the two liquid crystal cells are perpendicular to each other.

Figure 2:
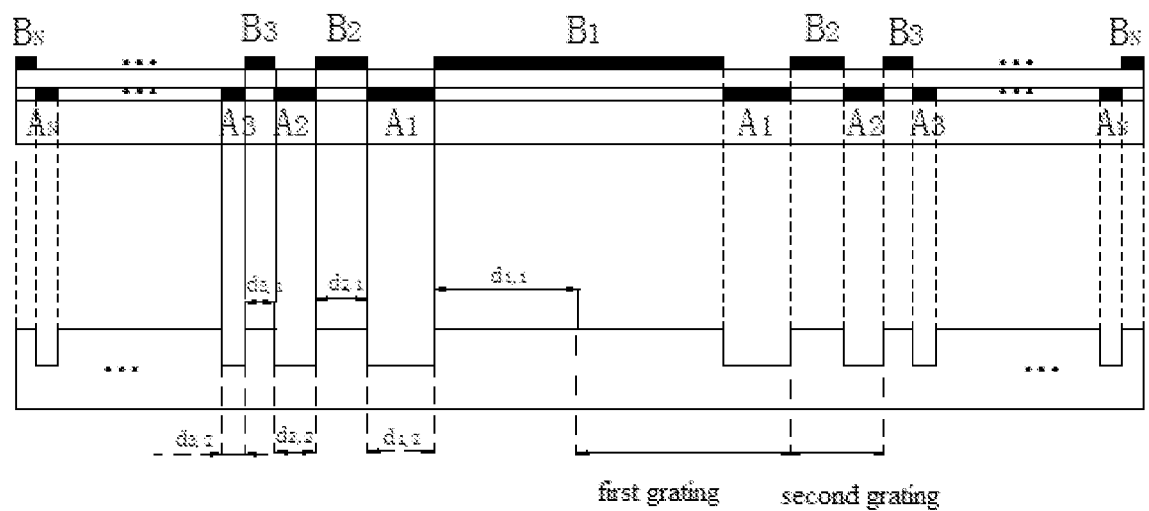
FIG. 2 is a schematic partial diagram of a first electrode sub-layer and a second electrode sub-layer according to an embodiment of the present disclosure.
Figure 4:
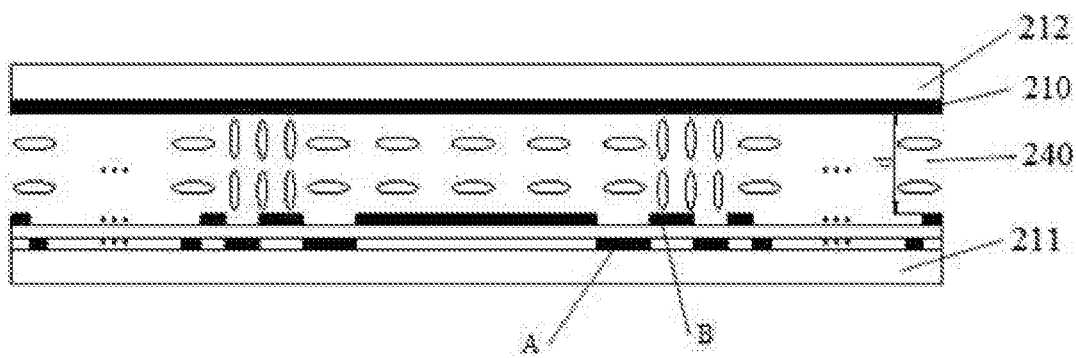
FIG. 4 is a schematic structural diagram of a liquid crystal lens in which some liquid crystal molecules are deflected according to an embodiment of the present disclosure.

In some optional embodiments, as shown in FIG. 2 or FIG. 4, orthographic projections of the first annular electrodes A onto the second transparent substrate 212 coincide with those of the second non-electrode regions onto the second transparent substrate 212.

In some optional embodiments, orthographic projections of the first non-electrode regions onto the second transparent substrate 212 coincide with those of the second annular electrodes B onto the first transparent substrate 211 or the second transparent substrate 212.

In some optional embodiments, the first transparent electrode layer 210, and the first annular electrodes A and the second annular electrodes B in the second transparent electrode layer 220 may be made of indium tin oxide (known as ITO).

Figure 3:
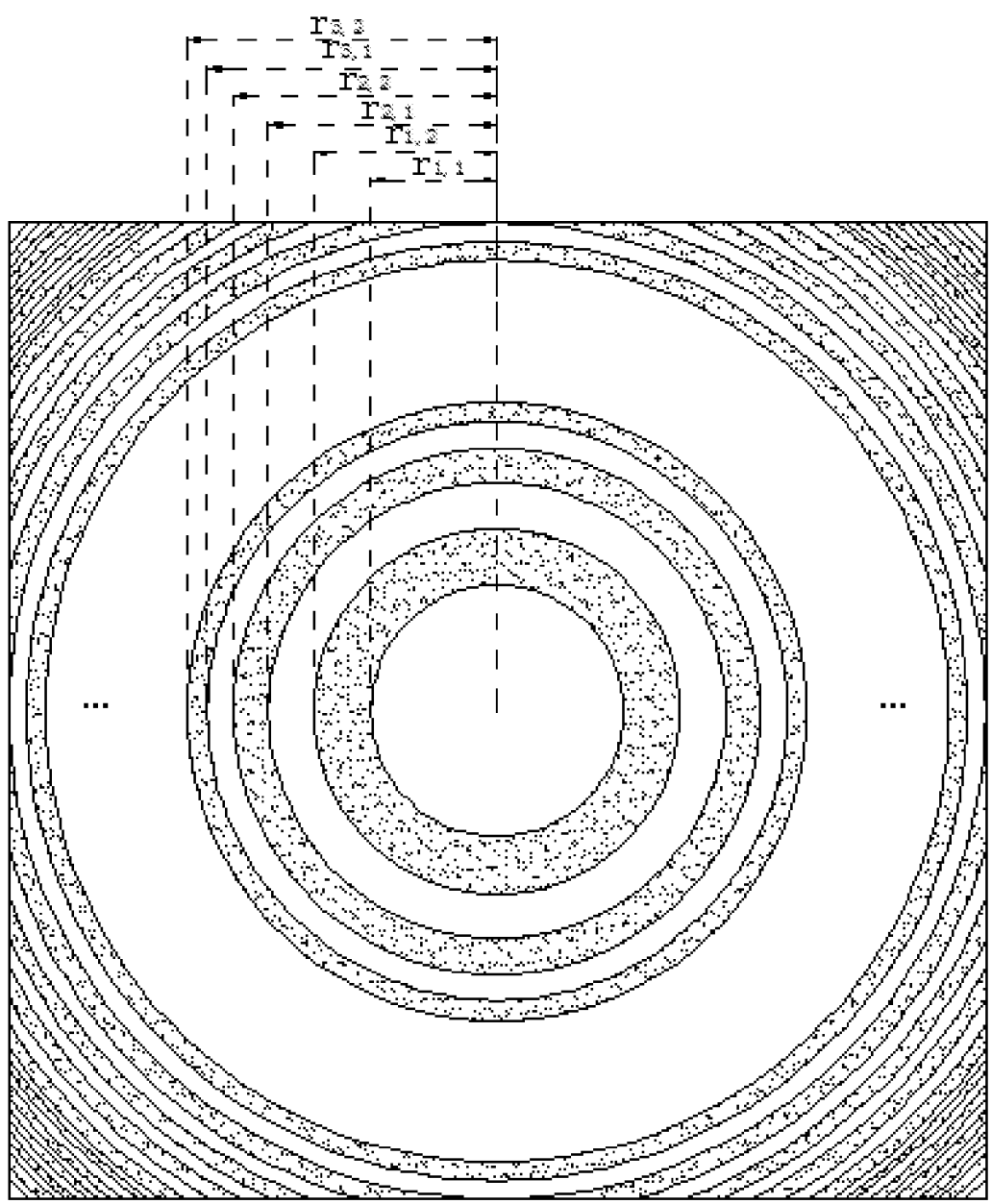
FIG. 3 is a top view of FIG. 2 according to the present disclosure.

In some optional embodiments, as shown in FIGS. 2 and 3, the N concentric first annular electrodes A, the N concentric second annular electrodes B and the liquid crystal layer form N equivalent phase grating units, where each grating unit is of a two-step shape. A phase difference between adjacent steps is π, and a step height is $$\frac{\lambda/2}{n_1 - n_2},$$

where λ is a wavelength of incident light (λ=587 nm in a case that the incident light is polychromatic light of white color), $n_1$ is a refractive index of a diffractive lens and $n_2$ is a refractive index of an ambient medium in contact with an outer surface of the diffractive lens (typically the ambient medium is air and the refractive index thereof $n_2$=1).

With reference to FIG. 2, the annular electrodes A are numbered $A_1, A_2, A_3 \ldots A_N$ sequentially from the center to both sides, and the annular electrodes B are numbered $B_1, B_2, B_3 \ldots B_N$ sequentially from the center to both sides. Regions between adjacent first annular electrodes are provided with no electrodes, and thus form the first non-electrode regions, and similarly, regions between adjacent second annular electrodes are provided with no electrodes and thus form the second non-electrode regions. Each equivalent phase grating unit includes two steps, where a first step corresponds to a first annular electrode, and a second step corresponds to a second annular electrode. According to the properties of a diffractive lens, an outer diameter of a first step of a $j^{th}$ equivalent phase grating unit may be calculated according to the following formula:

$$r_{j,1} = \left[\left(f_1' + \frac{(2j-1)\lambda/2}{n_2}\right)^2 - f_1'^2\right]^{1/2} = \sqrt{\frac{(2j-1)f_1'\lambda}{n_2}}\left(1 - \frac{(2j-1)\lambda}{4n_2 f_1'}\right)^{1/2},$$

and an outer diameter of a second step of $j^{th}$ equivalent phase grating unit can be calculated according to the following formula:

$$r_{j,2} = \left[\left(f_1' + \frac{j\lambda}{n_2}\right)^2 - f_1'^2\right]^{1/2} = \sqrt{\frac{2jf_1'\lambda}{n_2}}\left(1 - \frac{j\lambda}{2n_2 f_1'}\right)^{1/2},$$

where $f_1'$ is a focal length of the liquid crystal lens, λ is a wavelength of incident light (λ=587 nm in a case that the incident light is polychromatic light of white color), $n_2$ is a refractive index of an external medium in contact with a surface of the liquid crystal lens, j is a serial number of an equivalent phase grating unit numbered in such a manner as to increase in a radial direction starting from a center of the equivalent phase grating units and is smaller than N.

Based on the above, a width $d_{j,1}$ of a $j^{th}$ second annular electrode and a width $d_{j,2}$ of a $j^{th}$ first annular electrode are calculated according to the following formulas, respectively:

$$d_{j,1} = r_{j,1} - r_{j-1,2};$$

$$d_{j,2} = r_{j,2} - r_{j,1}.$$

With the focal length $f_1'$ of the liquid crystal lens, the wavelength λ of the incident light and the refractive index of the external medium $n_2$ being known, it can be calculated according to the foregoing formulas that a width of the first annular electrode $A_1$ is $d_{1,2}$, a width of the second first annular electrode $A_2$ is $d_{2,2}$, a width of the $N^{th}$ first annular electrode $A_N$ is $d_{N,2}$, a width of the first second annular electrode $B_1$ is $2*d_{1,1}$, a width of the second annular electrode $B_2$ is $d_{2,1}$, and a width of the $N^{th}$ second annular electrode $B_N$ is $d_{N,1}$, where widths of other annular electrodes can be obtained similarly and are thus not described herein.

In an embodiment of the present disclosure, as shown in FIG. 3, the first second annular electrode $B_1$ is arranged at the center of the N concentric equivalent phase grating units.

In some optional embodiments, assuming an initial alignment orientation of liquid crystal molecules of the liquid crystal layer is parallel with the paper (i.e., the horizontal direction in the FIG. 3), as shown in FIG. 4, when powered on, the powered-on annular electrodes and the first transparent electrode layer 210 form an electric field to deflect the liquid crystal molecules. A liquid crystal molecule has a high refractive index $n_e$ in a case that a long axis of the liquid crystal molecule is parallel with a polarization direction of incident light, and has a low refractive index $n_o$ in a case that that the long axis of the liquid crystal molecule is perpendicular to the polarization direction of the incident light. Thus, incident light passing through the liquid crystal lens can have optical distance differences by controlling the liquid crystal lens to have different refractive indexes at different positions of the liquid crystal lens, so that the liquid crystal lens may achieve the function of diffraction and has different equivalent focal lengths.

With comprehensive reference to FIGS. 1 and 4, for light with a polarization direction parallel with the initial alignment orientation of the liquid crystal molecules, when powered off, a long axis of a liquid crystal molecule is parallel with the polarization direction of the incident light and a refractive index thereof is $n_e$. In a case that the first first annular electrode $A_1$, the second first annular electrode $A_2$ and the first transparent electrode layer 210 are powered on, long axes of liquid crystal molecules corresponding to the first annular electrode $A_1$ and the second first annular electrode $A_2$ are parallel with the vertical direction as shown in FIG. 4, and in this case, the polarization direction of the incident light is perpendicular to the long axes of the liquid crystal molecules and a refractive index of the liquid crystal molecules is $n_o$. Thus, optical distances of liquid crystal molecules corresponding to the powered-on first annular electrodes $A_1$ and $A_2$ are reduced due to polarization, where an optical distance is the product of a thickness of the liquid crystal layer and a refractive index thereof. In order that liquid crystal molecules corresponding to a powered-on first annular electrode A and an adjacent powered-off first annular electrode have a fixed optical distance difference $\lambda/2$ to achieve optical diffraction, the thickness of the liquid crystal layer may be:

$$d = \frac{\lambda/2}{n_e - n_o},$$

where d is the thickness of the liquid crystal layer, $n_e$ is a liquid crystal refractive index for light with a polarization direction parallel with a long axis of a liquid crystal molecule passing through the liquid crystal molecule, and $n_o$ is a liquid crystal refractive index for light with a polarization direction perpendicular to the long axis of the liquid crystal molecule passing through the liquid crystal molecule. In this structure, adjacent phase grating units have an optical distance difference of $\lambda/2$ and thus a Fresnel half-wave retarder is formed, so that the liquid crystal lens is equivalent to a Fresnel lens, which has a light focusing function.

With comprehensive reference to FIGS. 2 and 4, the 2N annular electrodes are divided into N electrode groups, where each electrode group includes two adjacent annular electrodes (a first annular electrode A and a second annular electrode B), and the N electrode groups are numbered in sequence from the center to both sides. Odd-numbered electrode groups are powered off, and even-numbered electrode groups and the first transparent electrode layer 210 are powered on. In this way, an equivalent focal length of the diffractive lens is $2*f_1'$, where $f_1'$ is the minimum focal length of the liquid crystal lens. Specifically, the first annular electrode $A_1$ and the first second annular electrode $B_1$ in a first electrode group are powered off, and the second first annular electrode $A_2$ and the second annular electrode $B_2$ in a second electrode group and the first transparent electrode layer 210 are powered on. In this case, long axes of liquid crystal molecules corresponding to $A_1$ and $B_1$ are parallel with the polarization direction of the incident light, i.e., the horizontal direction in FIG. 4, and a liquid crystal refractive index is $n_e$; and long axes of liquid crystal molecules corresponding to $A_2$ and $B_2$ are perpendicular to the polarization direction of the incident light, i.e., the vertical direction in FIG. 4, and a liquid crystal refractive index is $n_o$. Thus, light passing through two adjacent electrode groups has an optical distance difference of $\lambda/2$, and thus a Fresnel half-wave retarder is formed, so that the liquid crystal lens is equivalent to a two-step-shaped Fresnel lens, which has a light focusing function.

In some optional embodiments, the first transparent electrode layer 210 is of a single-layer plate-like structure. During displaying an image, the first transparent electrode layer is kept powered on, and the first annular electrodes A and the second annular electrodes B are independently controlled to be powered on, so that liquid crystal molecules located corresponding to different electrodes have different refractive indexes and thereby the lens may have different focal lengths. The liquid crystal lens has a simple structure and powering of the electrodes can be easily controlled.

In some optional embodiments, each first electrode sub-layer A and each sub-electrode B are respectively provided with power supply wires, and the liquid crystal lens further includes a power supply module configured to control power supply states of each first annular electrode and each second annular electrode independently through respective power supply wires to achieve multiple adjustable focal lengths of the liquid crystal lens.

In order to better control power supply of the first annular electrodes A and the second annular electrodes B, each first annular electrode and each second annular electrode are respectively provided with power supply wires, and the power supply module independently supplies power to each electrode through a corresponding wire. In some optional embodiments, the power supply module is configured to:

power on the first transparent electrode layer; and divide the 2N annular electrodes in the second transparent electrode layer into x electrode groups, where each electrode group includes m adjacent annular electrodes and x=int (2N/m), number the x electrode groups in sequence in a radial direction starting from a center of the annular electrode, and power off the odd-numbered electrode groups and power on the even-numbered electrodes groups, whereby an equivalent focal length of the liquid crystal lens is:

$$f_m = m*f_1,$$

where $f_1$ is the minimum focal length of the liquid crystal lens, m is a positive integer smaller than N, and int means taking an integer of the number 2N/m.

Figure 5:
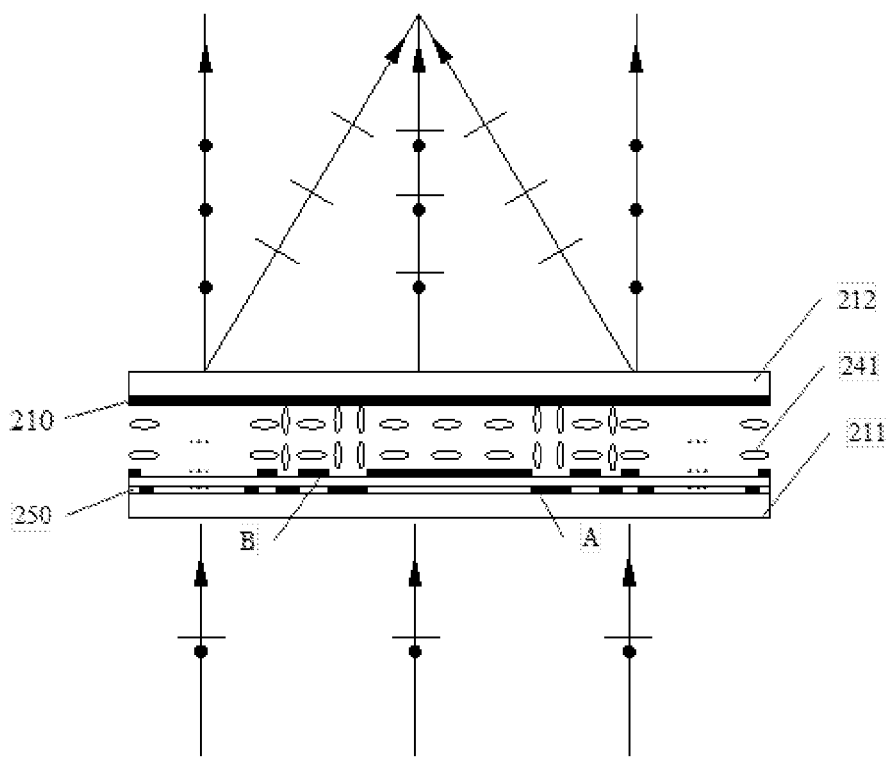
FIG. 5 is a schematic diagram of a deflected optical path of natural light which passes through a first liquid crystal cell according to an embodiment of the present disclosure.

Further, with comprehensive reference to FIGS. 1, 4 and 5, in order to avoid electrical interference between the first electrode sub-layer 221 and the second electrode sub-layer 222, an insulation layer 250 which has an electrical insulation function is provided between the first electrode sub-layer 221 and the second electrode sub-layer 222.

In the foregoing embodiments, step-shaped annular electrodes are provided, which renders the liquid crystal lens equivalent to a Fresnel lens, and the electrodes can be made relatively thin, where a thickness of the liquid crystal lens is comparable to the wavelength of the incident light, which facilitates lightening and thinning of the liquid crystal lens. The focal length of the liquid crystal lens can be adjusted by controlling power supply states of respective annular electrodes, and thereby an image displayed on the display module can be further imaged in multiple spatial depths. In addition, the liquid crystal lens can be combined with a light guide module, and the light guide module can guide imaging light into an eye of a user, thereby achieving VR display with multiple spatial depths of imaging; or the light guide module may also guide the imaging light and real ambient light both into the eye of the user, thereby achieving AR display with multiple spatial depths of imaging. The liquid crystal lens has a flat structure, where multiple adjustable focal lengths can be achieved without involvement of multiple lenses, and it also has a smaller spatial volume, which facilitates combination with the display module and the light guide module and enables flattening of the whole device.

In some optional embodiments, the initial alignment orientation of liquid crystal molecules in the first liquid crystal layer is parallel with an extending direction of the plate-like first transparent electrode layer 210, i.e., the horizontal direction in FIG. 1*a*, and the initial alignment orientation of liquid crystal molecules in the second liquid crystal layer is perpendicular to that of liquid crystal molecules in the first liquid crystal layer and parallel with the plate-like first transparent electrode layer 210, i.e., the direction normal to the paper in FIG. 1*a*.

The initial alignment orientation of the liquid crystal molecules in the first liquid crystal cell 21 is the horizontal direction, and the liquid crystal molecules are deflected always parallel with the paper when power is supplied to the first liquid crystal cell. For light with a polarization direction perpendicular to the initial alignment orientation of the liquid crystal molecules and parallel with the first transparent substrate 211, i.e., light with a polarization direction normal to the paper in the embodiment, long axes of the liquid crystal molecules are always perpendicular to the polarization direction of the light no matter whether the first liquid crystal cell is powered on or not, hence a refractive index of the liquid crystal layer is always $n_o$ for the light. In this case, the liquid crystal layer is equivalent to a plate glass, which does not have a light focusing function.

In the liquid crystal lens according to the embodiment, each of the first liquid crystal cell 21 and the second liquid crystal cell 22 is equivalent to a concave-convex Fresnel lens. As shown in FIG. 5, the initial alignment orientation of the liquid crystal molecules in the first liquid crystal cell 21 is parallel with the paper, and natural light includes light components with two orthographic polarization directions, namely, light with a polarization direction parallel with the paper (for example, light denoted by line segments in FIG. 5, which is referred to as first polarized light hereinafter) and light with a polarization direction normal to the paper (for example, light denoted by black dots in FIG. 5, which is referred to as second polarized light hereinafter). When the natural light is incident on the first liquid crystal cell 21, the second polarized light transmits through the first liquid crystal cell 21 with no deflection, as the polarization direction of the second polarized light is always perpendicular to the orientation of the liquid crystal molecules due to the fact that the liquid crystal molecules are deflected always parallel with the paper when power is supplied to the electrode layers. The alternately powered liquid crystal cell 21 functions as a diffraction lens for the first polarized light in the natural light, and the first polarized light is converged to a focus of the liquid crystal lens 21 after passing through the liquid crystal cell 21.

Figure 6:
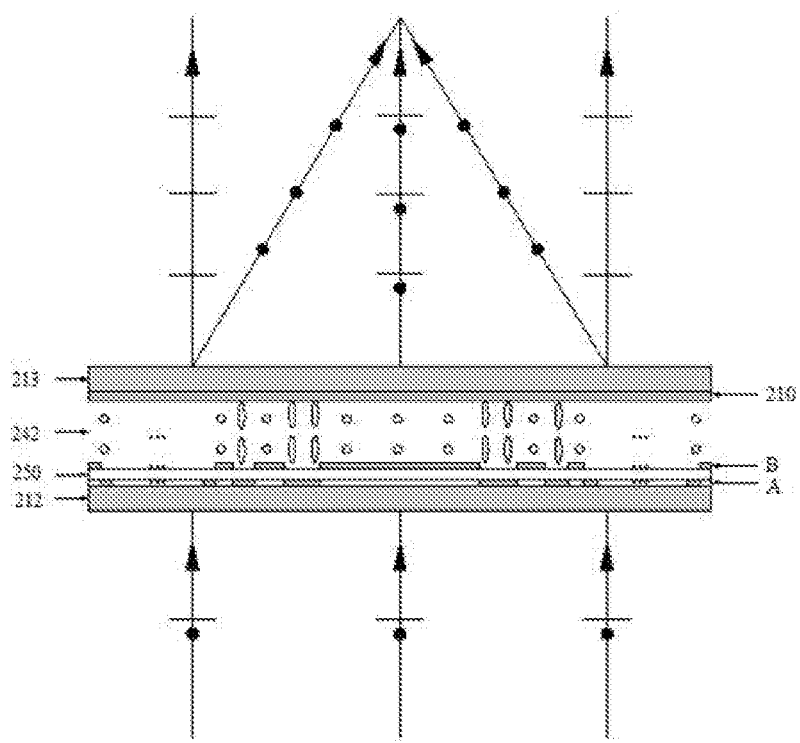
FIG. 6 is a schematic diagram of a deflected optical path of natural light which passes through a second liquid crystal cell according to an embodiment of the present disclosure.

As shown in FIG. 6, the initial alignment orientation of the liquid crystal molecules in the second liquid crystal cell 22 is normal to the paper. When the natural light is incident on the second liquid crystal cell 22, the first polarized light in the natural light transmits through the second liquid crystal cell 22 with no deflection on the propagation direction thereof, and the second polarized light in the natural light is deflected and is converged to a focus of the second liquid crystal cell 22.

Figure 7:
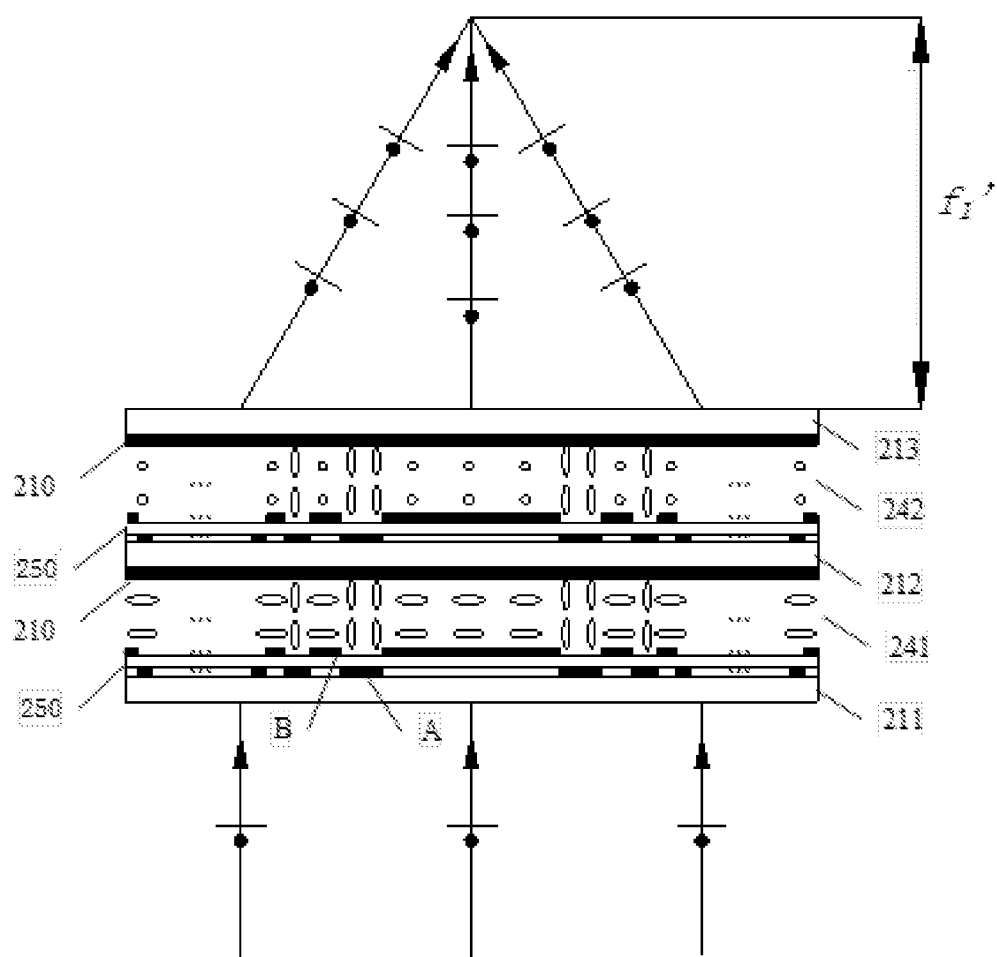
FIG. 7 is a schematic diagram of a deflected optical path of natural light which passes through a liquid crystal lens according to an embodiment of the present disclosure.

It should be noted that the electrodes layers 210 and 220 of the first liquid crystal cell 21 are arranged and powered in the same manner as those in the second liquid crystal cell 22, and therefore, the first liquid crystal cell 21 and the second liquid crystal cell 22 have a same equivalent focal length, i.e., having a common focus. As shown in FIG. 7, when natural light is incident on the first liquid crystal cell 21, the first polarized light in the natural light is not deflected, and the second polarized light in the natural light is converged to the focus; and the first polarized light is converged to the focus after passing through the second liquid crystal cell 22, a propagation direction of the second polarized light is not changed after passing through the second liquid crystal cell 22 and the second polarized light is still converged to the focus. In this way, the polarized lights with two orthographic polarization directions are both converged to the focus of the liquid crystal lens, and thus, no loss is caused to the polarized light components, improving optical efficiency of the liquid crystal lens.

Figure 1B:
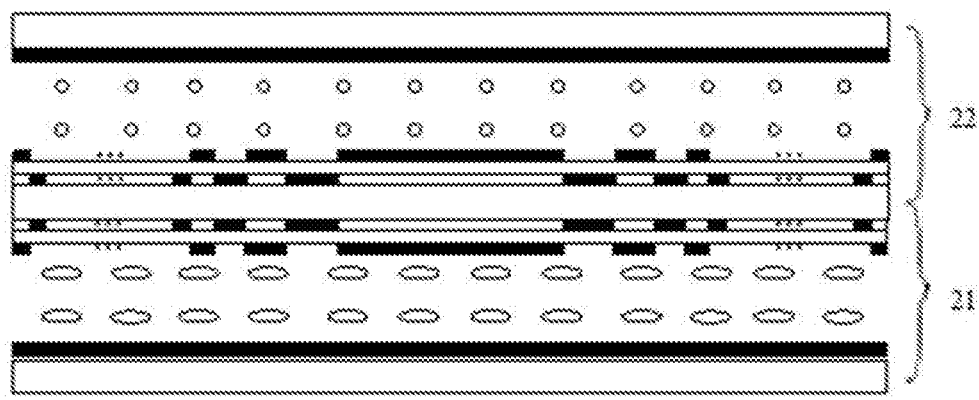
FIG. 1b is a schematic structural diagram of a liquid crystal lens according to an embodiment of the present disclosure.
Figure 1C:
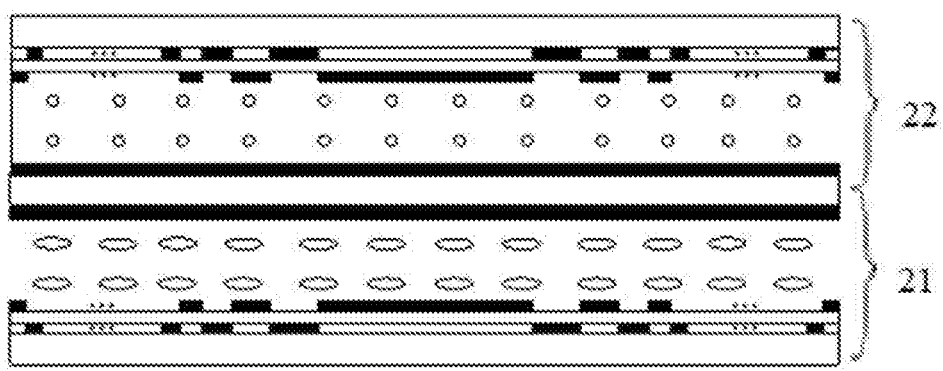
FIG. 1c is a schematic structural diagram of a liquid crystal lens according to an embodiment of the present disclosure.
Figure 1D:
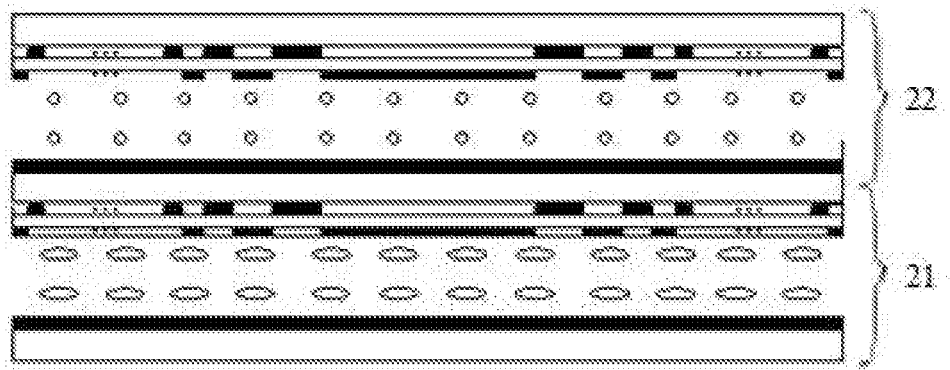
FIG. 1d is a schematic structural diagram of a liquid crystal lens according to an embodiment of the present disclosure.

In some optional embodiments, as shown in FIG. 1a, the second transparent electrode layer 220 in the first liquid crystal cell 21 is arranged between the first transparent substrate 211 and the first liquid crystal layer 241, and the second transparent electrode layer 220 in the second liquid crystal cell 22 is arranged between the second transparent substrate 212 and the second liquid crystal layer 242; or as shown in FIG. 1b, the second transparent electrode layer 220 in each of the first liquid crystal cell 21 and the second liquid crystal cell 22 is arranged between the second transparent substrate 212 and a liquid crystal layer in a respective one of the first liquid crystal cell 21 and the second liquid crystal cell 22; or as shown in FIG. 1c, the second transparent electrode layer 220 in the first liquid crystal cell 21 is arranged between the first transparent substrate 211 and the first liquid crystal layer 241, and the second transparent electrode layer 220 in the second liquid crystal cell 22 is arranged between the third transparent substrate 213 and the second liquid crystal layer 242; or as shown in FIG. 1d, the second transparent electrode layer 220 in the first liquid crystal cell 21 is arranged between the second transparent substrate 212 and the first liquid crystal layer 241, and the second transparent electrode layer 220 in the second liquid crystal cell 22 is arranged between the third substrate 213 and the second liquid crystal layer 242.

Figure 8:
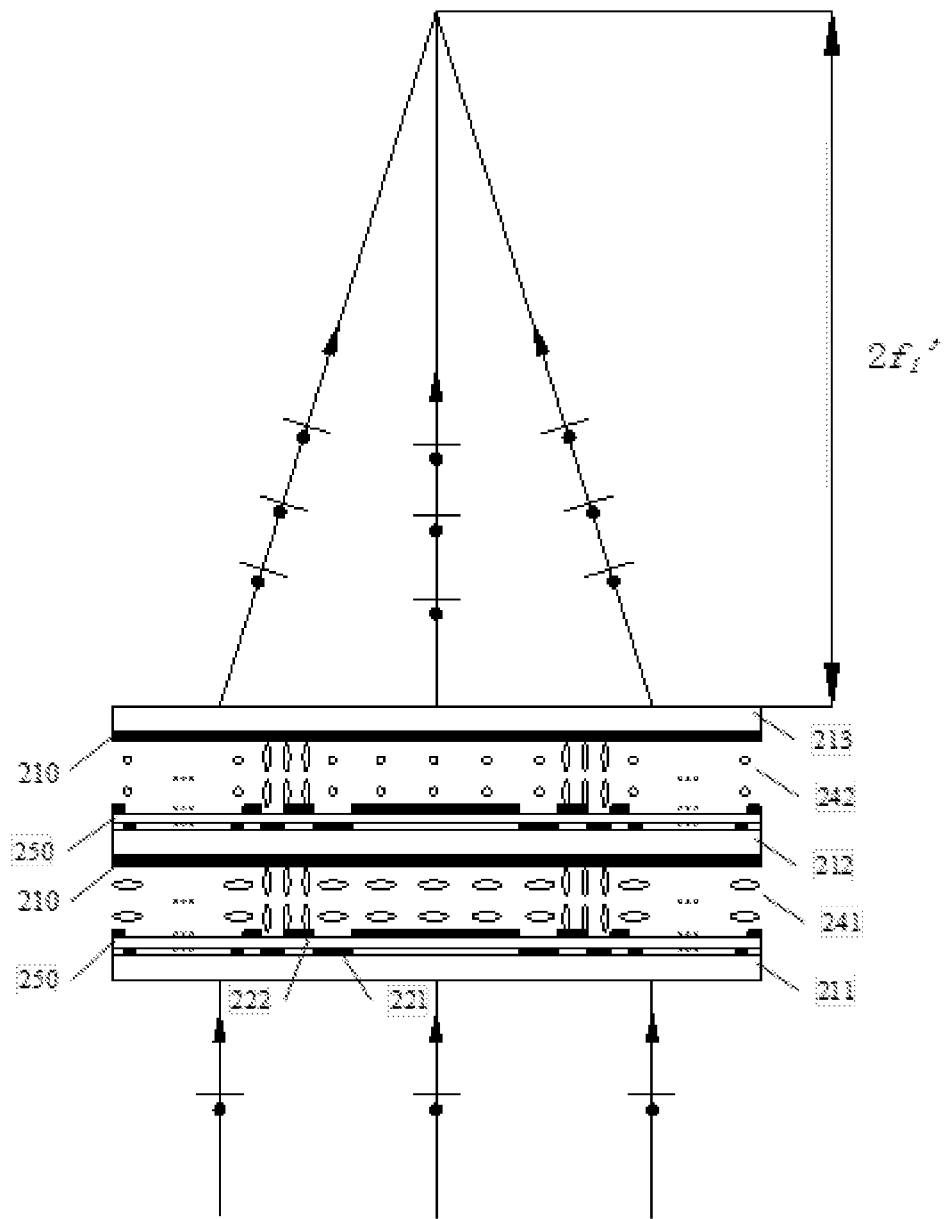
FIG. 8 is a schematic diagram of a deflected optical path of natural light which passes through a liquid crystal lens according to an embodiment of the present disclosure.

FIG. 8 shows an optical path in a case that the focal length of the liquid crystal lens is $2f_1'$, and images with different spatial depths can be formed with the lens with different focal lengths. The liquid crystal lens can be powered at a high frequency, and accordingly, the liquid crystal lens can be adjusted to different focal lengths at a high frequency. In this way, visually continuous images can be formed in different spatial depths for natural light, which avoids loss of polarized light components and improves optical efficiency of the liquid crystal lens.

A display device is further provided according to an embodiment of the present disclosure, which includes:

a light guide module, including a light incident region and a light emergent region;

a display module 20, arranged corresponding to the light incident region of the light guide module and configured to display images; and a liquid crystal lens 10, arranged between the display module 20 and the light guide module and corresponding to the light incident region of the light guide module and configured to form virtual images for the images displayed on the display module, where the light guide module is configured to guide light emergent from the liquid crystal lens 10 to propagate in a direction from the light incident region to the light emergent region within the light guide module.

The liquid crystal lens 10 has the structure as shown in FIG. 1, and can achieve the beneficial effects as described in the foregoing embodiments, which are therefore not described herein.

In some optional embodiments, the light guide module includes waveguide gratings. As shown in FIG. 8, the light guide module includes: a light guide plate 31; a light guide-in grating 32, arranged corresponding to the light incident region and at a side of the light guide plate 31 facing away from the liquid crystal lens 10; and a light guide-out grating 33, arranged at a same side with the light guide-in grating 32 and corresponding to the light emergent region. The liquid crystal lens 10 is arranged at the light incident region and is between the light guide plate 31 and the display module 20.

It should be noted that light diffracted by the liquid crystal lens 10 is mainly first-order diffraction light, and the light guide plate 31 is mainly configured to regulate a propagation direction of the first-order diffraction light.

In some embodiments, as shown in FIG. 8, the light guide-out grating 33 is further configured to guide ambient light from near the display module 20 into an eye 50 of a user, and the light guide module can achieve augmented reality display by guiding both light from the display module 20 and the ambient light from near the display module 20 into the eye 50 of the user.

It should be noted that light entering the eye 50 of the user mainly includes zero-order diffraction light of the ambient light from the light guide-out grating 33.

Figure 10:
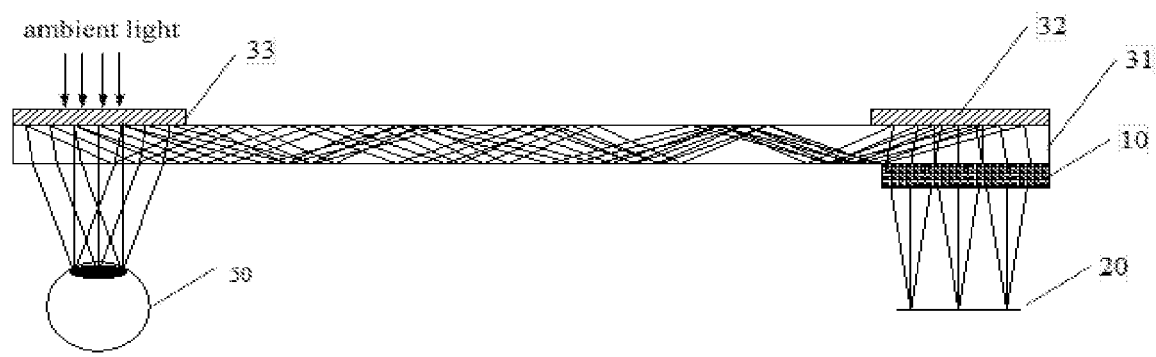
FIG. 10 is a schematic diagram of a display device according to an embodiment of the present disclosure.

In this embodiment, as shown in FIG. 10, an angle of view of AR display is determined by a grating constant and a refractive index of the light guide plate. Assuming $\omega$ to be a half angle of view of AR display and $\omega'$ to be a refraction angle in the light guide plate, according to the law of refraction, we have the following equation:

$$\sin \omega = n \sin \omega'$$

Assuming $\theta_1$ and $\theta_2$ are diffraction angles of a grating, n is the refractive index of the light guide plate and d is the grating constant (a cycle of the grating), according to the grating equation and the conditions for total reflection within the light guide plate, the foregoing parameters are related by the following mathematics:

$$nd\ \sin\theta_1 + nd\ \sin\omega' = \lambda$$
$$nd\ \sin\theta_2 - nd\ \sin\omega' = \lambda$$
$$\frac{1}{n} \leq \sin\theta_1 < 1$$
$$\frac{1}{n} \leq \sin\theta_2 < 1.$$

The following inequalities can be obtained by organizing the above mathematic expressions:

$$\begin{cases} \frac{\lambda}{d} - n < \sin\omega \leq \frac{\lambda}{d} - 1 \\ 1 - \frac{\lambda}{d} \leq \sin\omega < n - \frac{\lambda}{d} \end{cases}.$$

That is, the half angle of view $\omega$ as a function of the grating constant d is defined by the following equation:

$$\omega(d) = \min\left\{\arcsin\left(\frac{\lambda}{d} - 1\right), \arcsin\left(n - \frac{\lambda}{d}\right)\right\}.$$

Figure 11:
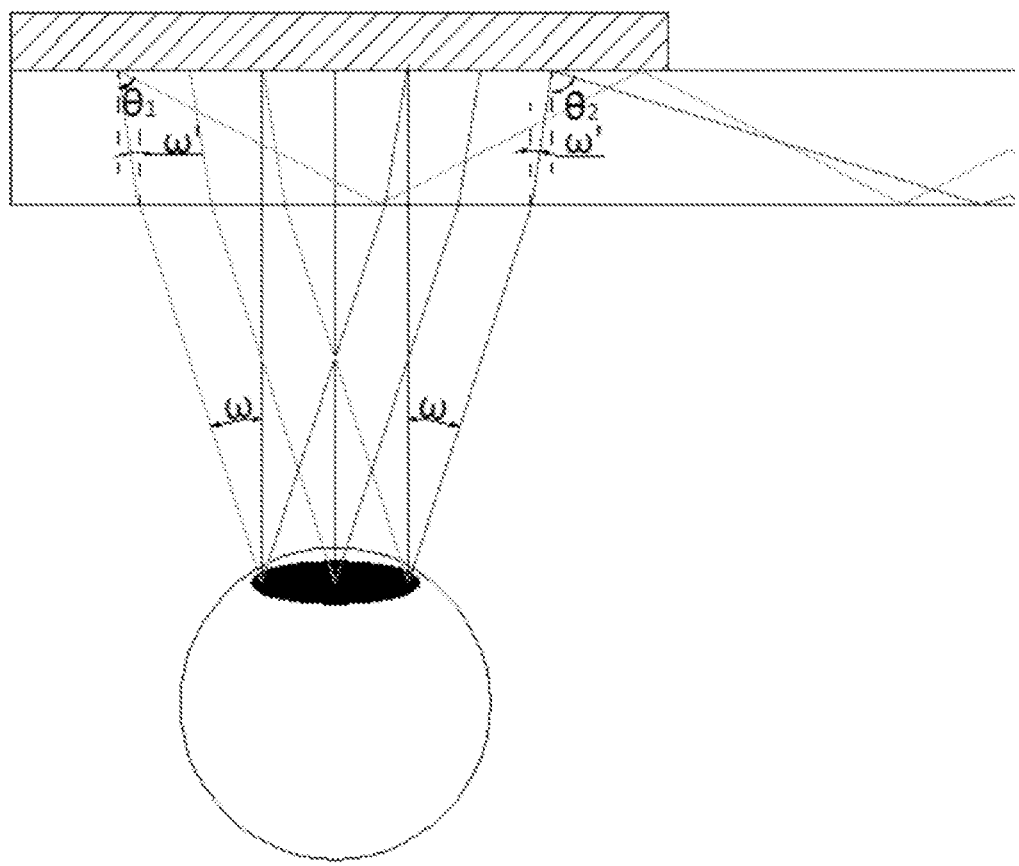
FIG. 11 is a schematic diagram of calculation of an angle of view in an embodiment of the present disclosure.
Figure 12:
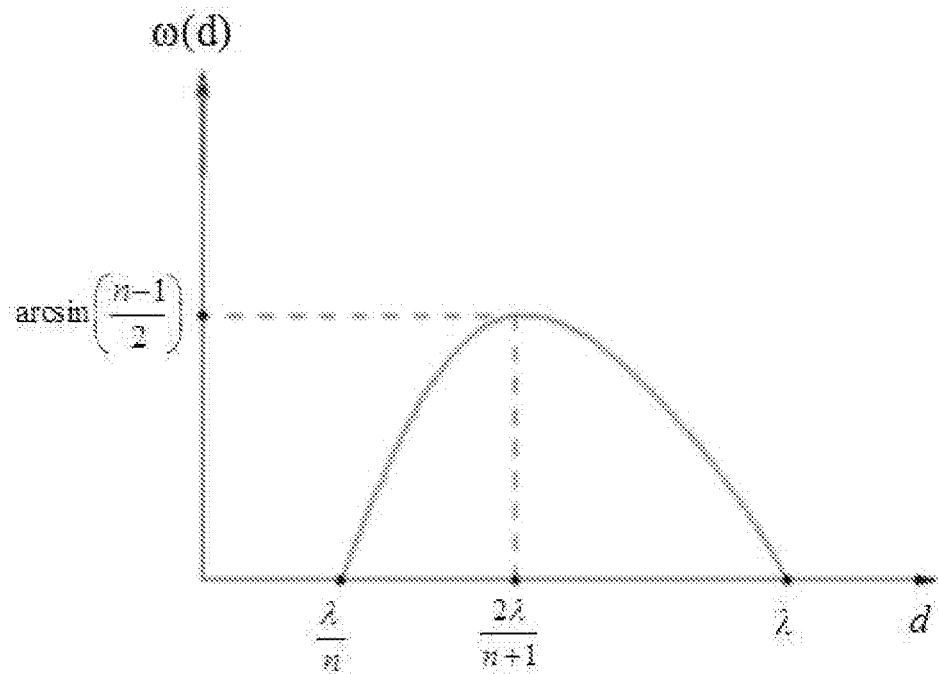
FIG. 12 is a graph of showing a half angle of view as a function of grating constant according to an embodiment of the present disclosure.

The equation above may be reorganized to be a piecewise function defined by the following equation, and a graph of the function is shown in FIG. 11:

$$\omega(d) = \begin{cases} \arcsin\left(n - \frac{\lambda}{d}\right) & \frac{\lambda}{d} \leq d \leq \frac{2\lambda}{n+1} \\ \arcsin\left(\frac{\lambda}{d} - 1\right) & \frac{2\lambda}{n+1} \leq d \leq \lambda \end{cases}.$$

Thus, a maximum value of the half angle of view is determined according to the following equation with $$d = \frac{2\lambda}{n+1}:$$

$$\omega(d)_{max} = \arcsin\left(\frac{n-1}{2}\right).$$

The half angle of view determines a view scope of the display device, where the greater the half angle of view is, the greater the angle of view is, and accordingly, the wider the view scope is.

Optionally, a distance between the display module and the liquid crystal lens is not greater than the minimum adjustable focal length of the liquid crystal lens. Such a configuration can meet imaging requirements of the display module and the liquid crystal lens in a case that the focal length of the liquid crystal lens is the minimum focal length.

Figure 9:
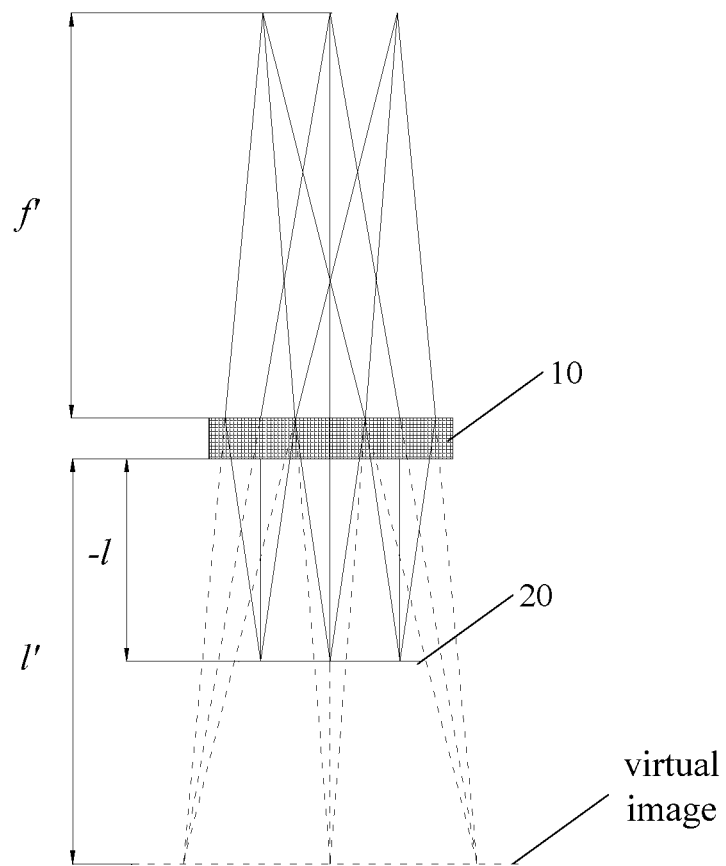
FIG. 9 is a schematic diagram of imaging of a display device according to an embodiment of the present disclosure.

The liquid crystal lens 10 and the display module 20 are arranged in accordance with the configuration as shown in FIG. 9, where an object distance −l is smaller than a focal length f' of the liquid crystal lens, and in this case, the liquid crystal lens 10 forms a magnified virtual image for an image displayed on the display module 20. According to the optical object-image relation, image distances of images formed by lenses with different focal lengths for the same display module with a fixed object distance are different, thereby forming virtual images with different spatial depths. The optical object-image relation is expressed as the following equation:

$$\frac{1}{l'}\frac{1}{l} = \frac{1}{f'}.$$

Preferably, the object distance −l may be designed to be equal to the minimum focal length $f_1'$ of the liquid crystal lens. According to the equation above, in a case that the focal length f' of the liquid crystal lens meets $f'=f_1'$, the image distance $l'=\infty$; in a case that the focal length f' of the liquid crystal lens meets $f'=f_2'=2f_1'$, the image distance $l'=-2f_1'$; and in a case that the focal length f' of the liquid crystal lens meets $f'=f_3'=3f_1'$, the image distance $l'=-1.5f_1$. Continuing in this manner, multi-spatial-depth imaging can be achieved.

The display module in this aspect may be a liquid crystal display (LCD), an organic light emitting diode (OLED) or any other module with a display function. For example, the display module may be a built-in display of an AR device, or a portable display module such as a cellphone or a tablet computer which can be inserted into a display device.

In the display device according to the foregoing embodiments, step-shaped annular electrodes are provided, which renders the liquid crystal lens equivalent to a Fresnel lens, and the electrodes can be made relatively thin, where a thickness of the liquid crystal lens is comparable to the wavelength of the incident light, which facilitates lightening and thinning of the liquid crystal lens. The focal length of the liquid crystal lens can be adjusted by controlling power supply states of respective annular electrodes, and thereby an image displayed on the display module can be further imaged in multiple spatial depths. In addition, the liquid crystal lens can be combined with a light guide structure, and the light guide structure can guide imaging light into an eye of a user, thereby achieving VR display with multiple spatial depths of imaging; or the light guide structure may also guide the imaging light and real ambient light both into the eye of the user, thereby achieving AR display with multiple spatial depths of imaging. The liquid crystal lens has a flat structure, where multiple adjustable focal lengths can be achieved without involvement of multiple lenses, and it also has a smaller spatial volume, which facilitates combination with the display module and the light guide module, and enables flattening of the whole device.

A method for controlling the liquid crystal lens according to the foregoing embodiments is further provided according to an embodiment of the present disclosure. The method includes powering on the two liquid crystal cells in the following manner:

dividing the 2N annular electrodes into x electrode groups, where each electrode group includes m adjacent annular electrodes and x=int (2N/m), numbering the x electrode groups in sequence in a radial direction starting from a center of the annular electrode, powering off the odd-numbered electrode groups, and powering on the even-numbered electrodes groups and the first transparent electrode layer, whereby an equivalent focal length of the liquid crystal cells is:

$$f_m = m^* f_1,$$

where $f_1$ is the minimum focal length of the liquid crystal lens and m is a positive integer smaller than N.

For example, as shown in FIGS. 2 and 8, the 2N annular electrodes are divided into N electrode groups with each group including two adjacent annular electrodes, the electrodes $A_1$ and $B_1$ of a first electrode group are powered off, the electrodes $A_2$ and $B_2$ of a second electrode group are powered on, the electrodes $A_3$ and $B_3$ of a third electrode group are powered off, and so on. That is, electrode groups with odd serial numbers are powered off and electrode groups with even serial numbers are powered on. In this way, an equivalent focal length of the liquid crystal lens is $f_2=2f_1'$.

In another example, the 2N annular electrodes are divided into int(2N/3) electrode groups with each group including three adjacent annular electrodes, the electrodes $A_1$, $B_1$ and $B_2$ of a first electrode group are powered off, the electrodes $A_2$, $B_3$ and $A_3$ of a second electrode group are powered on, the electrodes $B_4$, $A_4$ and $B_5$ of a third electrode group are powered off and so on. In this way, an equivalent focal length of the liquid crystal lens is $f_3=3f_1'$. By this method of focal length switching, the liquid crystal lens can have a series of focal lengths such as f4=4f1', f5=5f1' and $f_6=6f_1'$. The focal length of the liquid crystal lens can be adjusted by controlling power supply states of respective annular electrodes. VR display can be achieved by forming images with different spatial depths for an image displayed on the display module, and multi-spatial-depth AR display can be achieved by guiding both imaging light and real ambient light into an eye of a user.

The electrodes layers 210 and 220 of the first liquid crystal cell 21 are arranged and powered in the same manner as those in the second liquid crystal cell 22, and therefore, the first liquid crystal cell 21 and the second liquid crystal cell 22 have a same equivalent focal length, i.e., having a common focus. When natural light is incident on the first liquid crystal cell 21, the first polarized light in the natural light is not deflected, and the second polarized light in the natural light is converged to the focus; and the first polarized light is converged to the focus after passing through the second liquid crystal cell 22, a propagation direction of the second polarized light is not changed after passing through the second liquid crystal cell 22 and the second polarized light is still converged to the focus. In this way, the polarized lights with two orthographic polarization directions are both converged to the focus of the liquid crystal lens, and thus, no loss is caused to the polarized light components, improving optical efficiency of the liquid crystal lens.

The first transparent electrode layer is of a single-layer plate-like structure. During displaying an image, the first transparent electrode layer is kept powered on, and the first annular electrodes A and the second annular electrodes B are independently controlled to be powered on, so that liquid crystal molecules located corresponding to different electrodes have different refractive indexes and thereby the lens may have different focal lengths. The liquid crystal lens has a simple structure and powering of the electrodes can be easily controlled.

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including", or "comprising" and the like mean that an element or an article preceding the term contains elements or items and equivalents thereof behind the term, but does not exclude other elements or items. Such terms as "connected", or "interconnected" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

It shall be understood that when an element such as a layer, a film, a region or a substrate is referred to as being "on" or "under" another element, the element may be "directly" "on" or "under" the another element, or there may exist an intervening element.

The specific characteristics, structures, materials or features according to the foregoing embodiments may be combined in appropriate manners in any one or more embodiments or examples.

The above embodiments are merely optional embodiments of the present disclosure, which impose no limitation on the scope of the present disclosure. It should be noted that numerous improvements and modifications may be made by those skilled in the art without departing from the principle of the present disclosure, and these improvements and modifications shall also fall within the scope of the present disclosure. Therefore, the scope of the present disclosure shall be defined by the appended set of claims.

What is claimed is:

1. A liquid crystal lens, comprising a first transparent substrate and two liquid crystal cells arranged at two opposite sides of the first transparent substrate, wherein each of the two liquid crystal cells comprises:

a first transparent electrode layer and a second transparent electrode layer that are stacked; and a liquid crystal layer between the first transparent electrode layer and the second transparent electrode layer;

wherein the second transparent electrode layer comprises a first electrode sub-layer and a second electrode sub-layer that are stacked in sequence; and the first transparent electrode layer is of a plate-like structure, the first electrode sub-layer comprises N concentric first annular electrodes, and the second electrode sub-layer comprises N concentric second annular electrodes, wherein N is a positive integer, and the first annular electrodes and the second annular electrodes are alternately arranged in a direction parallel with the first transparent electrode layer;

wherein initial alignment orientations of liquid crystal molecules in liquid crystal layers in the two liquid crystal cells are perpendicular to each other, wherein a first non-electrode region is formed between each two adjacent first annular electrodes, a second non-electrode region is formed between each two adjacent second annular electrodes, and orthographic projections of the first annular electrodes onto the first transparent substrate coincide with orthographic projections of second non-electrode regions onto the first transparent substrate, wherein the N concentric first annular electrodes, the N concentric second annular electrodes and the liquid crystal layer form N equivalent phase grating units, and each equivalent phase grating unit comprises two steps, wherein a first step of the two steps corresponds to the first annular electrode and a second step of the two steps corresponds to the second annular electrode;

an outer diameter of a first step of a $j^{th}$ equivalent phase grating unit is:

$$r_{j,1} = \sqrt{\frac{(2j-1)f_1'\lambda}{n_2}\left(1-\frac{(2j-1)\lambda}{4n_2 f_1'}\right)^{1/2}};$$

an outer diameter of a second step of the $j^{th}$ equivalent phase grating unit is:

$$r_{j,2} = \sqrt{\frac{2jf_1'\lambda}{n_2}\left(1-\frac{j\lambda}{2n_2 f_1'}\right)^{1/2}};$$

wherein $f_1'$ is a focal length of the liquid crystal lens, $\lambda$ is a wavelength of incident light, $n_2$ is a refractive index of an external medium in contact with a surface of the liquid crystal lens, j is a serial number of an equivalent phase grating unit numbered in such a manner as to increase in a radial direction starting from a center of the equivalent phase grating units and is smaller than N;

a width of a $j^{th}$ first annular electrode is:

$d_{j,1} = r_{j,1} - r_{j-1,2}$; and a width of a $j^{th}$ second annular electrode is:

$d_{j,2} = r_{j,2} - r_{j,1}$.

2. The liquid crystal lens according to claim 1, wherein a thickness d of the liquid crystal layer is:

$$d = \frac{\lambda/2}{n_e - n_o},$$

wherein $n_e$ is a liquid crystal refractive index for incident light with a polarization direction parallel with a long axis of a liquid crystal molecule in the liquid crystal layer, and $n_o$ is a liquid crystal refractive index for incident light with a polarization direction perpendicular to the long axis of the liquid crystal molecule in the liquid crystal layer.

3. The liquid crystal lens according to claim 1, further comprising a power supply module, wherein each first annular electrode and each second annular electrode are respectively provided with power supply wires, and the power module is configured to control power supply states of each first annular electrode and each second annular electrode independently through respective power supply wires to achieve a plurality of adjustable focal lengths of the liquid crystal lens.

4. The liquid crystal lens according to claim 3, wherein the power supply module is configured to:

power on the first transparent electrode layer; and divide the 2N annular electrodes in the second transparent electrode layer into x electrode groups, wherein each electrode group comprises m adjacent annular electrodes and x=int (2N/m), number the x electrode groups in sequence in a radial direction starting from a center of the annular electrodes, and power off the odd-numbered electrode groups and power on the even-numbered electrodes groups, whereby an equivalent focal length of the liquid crystal lens is:

$f_m = m * f_1$, wherein $f_1$ is a minimum focal length of the liquid crystal lens and m is a positive integer smaller than N.

5. The liquid crystal lens according to claim 1, further comprising a second transparent substrate and a third transparent substrate, wherein the second transparent substrate is arranged at a side of a liquid crystal layer in a first liquid crystal cell of the two liquid crystal cells far away from the first transparent substrate, and the third transparent substrate is arranged at a side of a liquid crystal layer in a second liquid crystal cell of the two liquid crystal cells far away from the first transparent substrate.

6. The liquid crystal lens according to claim 1, wherein an orthographic projection of the first electrode sub-layer in a first liquid crystal cell of the two liquid crystal cells onto the first transparent substrate coincide with an orthographic projection of the first electrode sub-layer in a second liquid crystal cell of the two liquid crystal cells onto the first transparent substrate, and orthographic projections of the second electrode sub-layer in the first liquid crystal cell onto the first transparent substrate coincide with an orthographic projection of the second electrode sub-layer in the second liquid crystal cell onto the first transparent substrate.

7. The liquid crystal lens according to claim 5, wherein the second transparent electrode layer in the first liquid crystal cell is arranged between the first transparent substrate and a liquid crystal layer in the first liquid crystal cell, and the second transparent electrode layer in the second liquid crystal cell is arranged between the second transparent substrate and a liquid crystal layer in the second liquid crystal cell; or the second transparent electrode layer in the first liquid crystal cell is arranged between the second transparent substrate and the liquid crystal layer in the first liquid crystal cell, and the second transparent electrode layer in the second liquid crystal layer is arranged between the third transparent substrate and the liquid crystal layer in the second liquid crystal cell; or the second transparent electrode layer in the first liquid crystal cell is arranged between the first transparent substrate and the liquid crystal layer in the first liquid crystal cell, and the second transparent electrode layer in the second liquid crystal cell is arranged between the third transparent substrate and the liquid crystal layer in the second liquid crystal cell; or the second transparent electrode layer in the first liquid crystal cell is arranged between the second transparent substrate and the liquid crystal layer in the first liquid crystal cell, and the second transparent electrode layer in the second liquid crystal is arranged between the second transparent substrate and the liquid crystal layer in the second liquid crystal cell.

8. A liquid crystal lens module, comprising a light guide module and the liquid crystal lens according to claim 1.

9. The liquid crystal lens module according to claim 8, wherein the light guide module comprises:
   a light guide plate; and
   a light guide-in grating and a light guide-out grating, arranged at two ends of the light guide plate;
   wherein the light guide-in grating and the liquid crystal lens are arranged at two opposite sides of the light guide plate, the light guide-in grating is configured to guide light from the liquid crystal lens into the light guide plate, and the light guide-out grating is arranged at a same side with the light guide-in grating and is configured to guide the light in the light guide plate to an eye of a user.

10. A display device, comprising:
   a light guide module, comprising a light incident region and a light emergent region;
   a display module, arranged corresponding to the light incident region of the light guide module and configured to display images; and
   a liquid crystal lens, arranged between the display module and the light guide module and corresponding to the light incident region of the light guide module, and configured to form virtual images for the images displayed on the display module,
   wherein the light guide module is configured to guide light emergent from the liquid crystal lens to propagate in a direction from the light incident region to the light emergent region within the light guide module,
   wherein the liquid crystal lens comprises a first transparent substrate and two liquid crystal cells arranged at two opposite sides of the first transparent substrate, wherein each of the two liquid crystal cells comprises:
   a first transparent electrode layer and a second transparent electrode layer that are stacked; and
   a liquid crystal layer between the first transparent electrode layer and the second transparent electrode layer;
   wherein the second transparent electrode layer comprises a first electrode sub-layer and a second electrode sub-layer that are stacked in sequence, the first transparent electrode layer is of a plate-like structure, the first electrode sub-layer comprises N concentric first annular electrodes, and the second electrode sub-layer comprises N concentric second annular electrodes, wherein N is a positive integer and the first annular electrodes and the second annular electrodes are alternately arranged in a direction parallel with the first transparent electrode layer;
   wherein initial alignment orientations of liquid crystal molecules in liquid crystal layers in the two liquid crystal cells are perpendicular to each other,
   wherein a first non-electrode region is formed between each two adjacent first annular electrodes, a second non-electrode region is formed between each two adjacent second annular electrodes, and
   orthographic projections of the first annular electrodes onto the first transparent substrate coincide with orthographic projections of second non-electrode regions onto the first transparent substrate,
   wherein the N concentric first annular electrodes, the N concentric second annular electrodes and the liquid crystal layer form N equivalent phase grating units, and each equivalent phase grating unit comprises two steps, wherein a first step of the two steps corresponds to the first annular electrode and a second step of the two steps corresponds to the second annular electrode;
   an outer diameter of a first step of $j^{th}$ equivalent phase grating unit is:

$$r_{j,1} = \sqrt{\frac{(2j-1)f_1'\lambda}{n_2}} \left(1 - \frac{(2j-1)\lambda}{4n_2 f_1'}\right)^{1/2};$$

an outer diameter of a second step of the $j^{th}$ equivalent phase grating unit is:

$$r_{j,2} = \sqrt{\frac{2jf_1'\lambda}{n_2}} \left(1 - \frac{j\lambda}{2n_2 f_1'}\right)^{1/2};$$

wherein $f_1'$ is a focal length of the liquid crystal lens, $\lambda$ is a wavelength of incident light, $n_2$ is a refractive index of an external medium in contact with a surface of the liquid crystal lens, j is a serial number of an equivalent phase grating unit numbered in such a manner as to increase in a radial direction starting from a center of the equivalent phase grating units and is smaller than N;
   a width of a $j^{th}$ first annular electrode is:
   $d_{j,1}=r_{j,1}-r_{j-1,2}$; and
   a width of a $j^{th}$ second annular electrode is:

$d_{j,2}=r_{j,2}-r_{j,1}.$

11. The display device according to claim 10, wherein a thickness d of the liquid crystal layer is:

$$d = \frac{\lambda/2}{n_e - n_o},$$

wherein $n_e$ is a liquid crystal refractive index for incident light with a polarization direction parallel with a long axis of a liquid crystal molecule in the liquid crystal layer, and $n_o$ is a liquid crystal refractive index for incident light with a polarization direction perpendicular to the long axis of the liquid crystal molecule in the liquid crystal layer.

12. The display device according to claim 10, further comprising a power supply module, wherein each first annular electrode and each second annular electrode are respectively provided with power supply wires, wherein the power supply module is configured to:
   power on the first transparent electrode layer; and
   divide the 2N annular electrodes in the second transparent electrode layer into x electrode groups, wherein each electrode group comprises m adjacent annular electrodes and x=int (2N/m), number the x electrode groups in sequence in a radial direction starting from a center of the annular electrodes, and power off the odd-numbered electrode groups and power on the even-numbered electrodes groups, whereby an equivalent focal length of the liquid crystal lens is:

$f_m=m*f_1,$ wherein $f_1$ is a minimum focal length of the liquid crystal lens and m is a positive integer smaller than N.

13. The display device according to claim 10, wherein the light guide module comprises:
   a light guide plate;
   a light guide-in grating, arranged corresponding to the light incident region and at a side of the light guide plate facing away from the liquid crystal lens, and configured to guide light from the liquid crystal lens with a plurality of adjustable focal lengths into the light guide plate; and
   a light guide-out grating, arranged corresponding to the light emergent region and at a same side with the light guide-in grating, and configured to guide the light in the light guide plate to an eye of a user.

14. The display device according to claim 10, wherein a distance between the display module and the liquid crystal lens is smaller than or equal to a minimum focal length adjustable of the liquid crystal lens.

15. The display device according to claim 13, wherein ambient light is incident on a side of the light guide-out grating away from the eye of the user, and the light guide-out grating is configured to guide zero-order diffraction light of the ambient light into the eye of the user,
   wherein a maximum half angle of view of the display device is:

$$\omega(d)_{max} = \arcsin\left(\frac{n-1}{2}\right),$$

wherein $\omega(d)_{max}$ is the maximum half angle of view, n is a refractive index of the light guide plate and a grating constant corresponding to the maximum half angle of view is $$d = \frac{2\lambda}{n+1}.$$

16. A method for controlling the liquid crystal lens according to claim 1,
   wherein the method comprises powering on the two liquid crystal cells simultaneously in the following manner:
   dividing the 2N annular electrodes into x electrode groups, wherein each electrode group comprises m adjacent annular electrodes and x=int (2N/m), numbering the x electrode groups in sequence in a radial direction starting from a center of the annular electrodes, powering off the odd-numbered electrode groups, and powering on the even-numbered electrodes groups and the first transparent electrode layer, whereby an equivalent focal length of the liquid crystal cells is:

$$f_m = m * f_1,$$

wherein $f_1$ is a minimum focal length of the liquid crystal lens and m is a positive integer smaller than N.

* * * * *